US008622306B2

(12) United States Patent
Matsumoto

(10) Patent No.: US 8,622,306 B2
(45) Date of Patent: Jan. 7, 2014

(54) BARCODE CREATION APPARATUS, BARCODE CREATION METHOD AND PROGRAM

(75) Inventor: Tetsuya Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 51 days.

(21) Appl. No.: 12/893,111

(22) Filed: Sep. 29, 2010

(65) Prior Publication Data

US 2011/0011926 A1    Jan. 20, 2011

Related U.S. Application Data

(62) Division of application No. 11/151,320, filed on Jun. 14, 2005, now Pat. No. 7,823,784.

(30) Foreign Application Priority Data

Jun. 14, 2004    (JP) .................................. 2004-175638

(51) Int. Cl.
*G06K 7/10*    (2006.01)

(52) U.S. Cl.
USPC ........................ 235/469; 235/462.01; 235/494

(58) Field of Classification Search
USPC .................. 235/468, 469, 462.1, 462.09, 494
See application file for complete search history.

(56) References Cited

U.S. PATENT DOCUMENTS

| 4,889,367 | A | 12/1989 | Miller |
| 5,369,261 | A * | 11/1994 | Shamir .......................... 235/469 |
| 6,572,025 | B1 * | 6/2003 | Nishikado et al. ............. 235/494 |
| 6,751,352 | B1 | 6/2004 | Baharav et al. |
| 7,025,269 | B2 | 4/2006 | Marshall |
| 7,028,902 | B2 | 4/2006 | Xu et al. |
| 7,207,491 | B2 | 4/2007 | Lubow |
| 7,337,972 | B2 | 3/2008 | Lubow |
| 2001/0047476 | A1 | 11/2001 | Yen et al. |
| 2004/0089727 | A1 | 5/2004 | Baharav et al. |
| 2005/0284944 | A1 * | 12/2005 | Ming ............................. 235/494 |
| 2006/0027662 | A1 | 2/2006 | Baradi |

FOREIGN PATENT DOCUMENTS

| JP | 9-50500 A | 2/1997 |
| JP | 9-212611 A | 8/1997 |
| JP | 2000-67191 A | 3/2000 |
| JP | 2002-56352 A | 2/2002 |
| JP | 2003-203196 A | 7/2003 |
| JP | 2004-110148 A | 4/2004 |
| WO | 02/45000 A2 | 6/2002 |

* cited by examiner

*Primary Examiner* — Jamara Franklin
(74) *Attorney, Agent, or Firm* — Sughrue Mion, PLLC

(57) ABSTRACT

The barcode creation apparatus which creates a barcode read in by a prescribed terminal device, comprises: a function specification device which specifies a function which allows the terminal device to startup when the barcode is read in, from a plurality of functions that the terminal device has; a color specification device which specifies a color of the barcode, the color representing the function specified by the function specification device; and a barcode creation device which creates the barcode in the specified color.

12 Claims, 14 Drawing Sheets

FIG.4

| FUNCTION | IDENTIFIER | BARCODE COLOR | DISPLAY CHARACTER | DISPLAY MARK | DISPLAY COLOR |
|---|---|---|---|---|---|
| MAIL | mailto: | blue | M | ✉ | black |
| Web | http:// | red | W | ○ | black |
| ... | ... | ... | ... | ... | ... |

1100

FIG.13
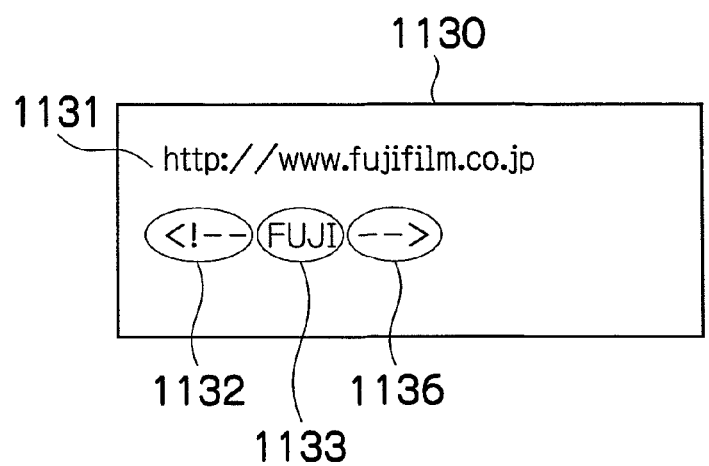
FIG.14A       FIG.14B       FIG.14C
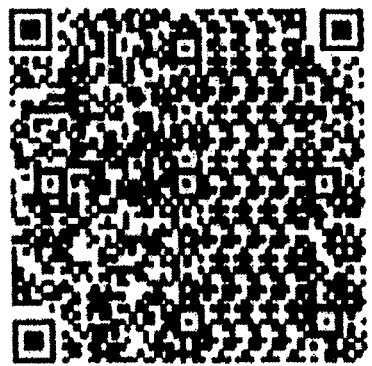                

BARCODE CREATION APPARATUS, BARCODE CREATION METHOD AND PROGRAM

CROSS-REFERENCE TO RELATED APPLICATIONS

This is a divisional of U.S. application Ser. No. 11/151,320, filed Jun. 14, 2005, which claims priority from Japanese Patent Applications No. 2004-175638 filed on Jun. 14, 2004. The entire disclosures of the prior applications are incorporated by reference herein.

BACKGROUND OF THE INVENTION

1. Field of the Invention

The present invention relates to a barcode creation apparatus, a barcode creation method and program, and more particularly to a barcode creation apparatus, a barcode creation method and program which create two-dimensional barcodes, one-dimensional barcodes, and other barcodes.

2. Description of the Related Art

One-dimensional barcodes and two-dimensional barcodes are used widely.

For example, a two-dimensional barcode called a QR code (registered trademark) has a square external shape, and represents information by positioning a plurality of black and white cells, which are the smallest units, in a two-dimensional matrix within the square shape. Furthermore, a QR code (registered trademark) can be read out quickly by providing a position determination pattern (referred to as called a locator symbol, or finder pattern) at three of the four corners of the square shape and arranging a timing pattern in the two-dimensional bar code, between these position determination patterns.

In such a two-dimensional barcode, it is possible to write a larger amount of information into a single barcode in comparison with a one-dimensional barcode. Therefore, the two-dimensional barcodes are used to write and read various types of information, such as a URL (Uniform Resource Locator), electronic mail address, sound information, text, and the like, rather than simple number sequences.

Japanese Patent Application Publication No. 2000-67191 discloses a method which multimedia information consisting of text, sound, and images is recorded and reproduced in the form of a two-dimensional color barcode. For example, the 3-bit sequences "100", "000", "011", "110", "101", "111", . . . of multimedia information comprising a text bit sequence "100111 . . . ", a sound bit sequence "001101 . . . " and an image bit sequence "001011 . . . ", is printed in the form of a two-dimensional color barcode comprising bits of respective colors, namely, "red", "purple", "green", "black", "white", "brown", and so on, in accordance with a correspondence table (i.e. the table indicates respective correspondences between the bit sequences and colors; for instance, "100" corresponds to "red", "000" corresponds to "purple", "011" corresponds to "green", "110" corresponds to "black", "101" corresponds to "white" and "111" correspond to "brown"). A color barcode printed in this way is read out in by a special reproduction apparatus which is capable of restoring the three types of information, namely the text, sound, and images.

Japanese Patent Application Publication No. 2002-56352 discloses a method in which a barcode is created by encoding the message into a two-dimensional bit pattern and embedding it into the half-tone logo according to the acquired message and logo. Japanese Patent Application Publication No. 2003-203196 discloses a barcode in which the external appearance thereof can be set freely to a round shape, a square shape, a triangular shape, or the like.

Japanese Patent Application Publication No. 9-50500 and Japanese Patent Application Publication No. 9-212611 disclose a barcode in which the external appearance thereof is formed into a picture, such as a tree, or fish.

However, since a barcode such as a QR code (registered trademark) is formed with a uniform external shape which is previously determined such as a square shape, and is printed in the form of black and white bars or cells, it is not possible to identify the type or the purpose according to information that has been written into the barcode, unless that barcode is read in. In particular, if only a barcode is printed, then it is not possible for the user to understand what it represents. Furthermore, design incompatibilities also arise with respect to the object into which the barcode is to be embedded. Therefore, the barcode is liable to acquire an image that is unattractive to the user, and it becomes difficult to entice the user to actually attempt to read the barcode into a terminal device.

In Japanese Patent Application Publication No. 2003-203196, the external appearance of the barcode can be set freely. However, if the external appearance has been changed freely, the barcode does not comply with the specifications relating to existing two-dimensional barcodes such as QR codes (registered trademark), and then a terminal device is not able to read in the two-dimensional barcodes.

Furthermore, in Japanese Patent Application Publication No. 2000-67191, with the objective of recording multimedia information efficiently, respective bit sequences of multimedia information are printed as color bits corresponding to those bit sequences. Therefore, it still remains impossible to identify what type of information is contained in the barcode, unless it is attempted to read in a barcode.

SUMMARY OF THE INVENTION

The present invention was devised in view of the foregoing circumstances, an object thereof being to provide a barcode creation apparatus, a barcode creation method, and a barcode creation program that can create a barcode which a user is able to read out with a terminal device owned by the user, without creating a sense of discomfort in the user.

In order to attain the aforementioned object, the present invention is directed to a barcode creation apparatus which creates a barcode read in by a prescribed terminal device, comprising: a function specification device which specifies a function which allows the terminal device to startup when the barcode is read in, from a plurality of functions that the terminal device has; a color specification device which specifies a color of the barcode, the color representing the function specified by the function specification device; and a barcode creation device which creates the barcode in the specified color.

Herein, a "barcode" is an object in which at least one of numerical figures, other characters, symbols, and a combination thereof is rewritten in a geometrical form such as a two-dimensional barcode (QR code, maxi code, data matrix, PDF417, etc.), a JAN code, ITF, UCC/EAN 128, and the like.

According to the present invention, since a barcode is created in a color which corresponds to the function which allows the terminal device to startup when the barcode is read in with the terminal device, it is possible for the user to identify the function which allows the terminal device to startup when that barcode is read in according to the color of the barcode. Therefore, the user can read the barcode into a terminal device owned by the user, without feeling a sense of discomfort.

In order to attain the aforementioned object, the present invention is also directed to a barcode creation apparatus which creates a barcode read in by a prescribed terminal device, comprising: a function specification device which specifies a function which allows the terminal device to startup when the barcode is read in, from a plurality of functions that the terminal device has; a display specification device which specifies a display which corresponds to the function specified by the function specification device, the display being embedded into at least one of a chromatic part and a black part on the barcode, the display comprising at least one of characters, a figure, a symbol, and a combination thereof; and a barcode creation device which creates the barcode in which the display specified by the display specification device is embedded into an embedding portion of the barcode with at least one of a different color and a different density with respect to the embedding portion, the embedding portion comprising at least one of the chromatic part and the black part on the barcode.

According to the present invention, since a barcode is created by being embedded with a display that corresponds to the function which allows the terminal device to startup when the barcode is read in, it is possible for the user to identify the function which allows the terminal device to startup when barcode is read in, according to the display embedded into the barcode. Therefore, the user can read the barcode into a terminal device owned by the user, without feeling a sense of discomfort.

In order to attain the aforementioned object, the present invention is also directed to a barcode creation apparatus which creates a barcode read in by a prescribed terminal device, comprising: a function specification device which specifies a function which allows the terminal device to startup when the barcode is read in, from a plurality of functions that the terminal device has; a display specification device which specifies a display which corresponds to the function specified by the function specification device, the display being embedded into the barcode by blanking out a form of the display into the barcode, the display comprising at least one of characters, a figure, a symbol, and a combination thereof; and a barcode creation device which creates the barcode that the display specified by the display specification device is embedded by blanking out the form of the display.

According to this composition, since a barcode is created which is blanked out by a display that corresponds to the function which allows the terminal device to startup when the barcode is read in, it is possible for the user to identify the function which allows the terminal device to startup when that barcode is read in, according to the display blanking out the barcode. Therefore, the user can read the barcode into a terminal device owned by the user, without feeling a sense of discomfort.

In order to attain the aforementioned object, the present invention is also directed to a barcode creation apparatus comprising: an input device which inputs contents of a display which is embedded into a barcode, the display comprising at least one of characters, a figure, a symbol, and a combination thereof; and a barcode creation device which creates the barcode in which the inputted contents of the display are embedded into an embedding portion of the barcode with at least one of a different color and at a different density from the embedding portion, the embedding portion comprising at least one of a chromatic part and a black part on the barcode.

According to the present invention, since a barcode embedded with the inputted display is created, it is possible for the user to identify the approximate contents of the barcode according to the display embedded into the barcode. Therefore, the user can read the barcode into a terminal device owned by the user, without feeling a sense of discomfort.

In order to attain the aforementioned object, the present invention is also directed to a barcode creation apparatus comprising: an input device which inputs contents of a display to be embedded into a barcode, the display comprising at least one of characters, a figure, a symbol, and a combination thereof; and a barcode creation device which creates the barcode into which the inputted contents of the display are embedded by blanking out a form of the display to the barcode.

According to the present invention, since a barcode blanked out with the inputted display is created, it is possible for the user to identify the approximate contents of the barcode according to the display blanked out in the barcode. Therefore, the user can read the barcode into a terminal device owned by the user, without feeling a sense of discomfort.

In order to attain the aforementioned object, the present invention is also directed to a barcode creation apparatus comprising: an arrangement determination device which determines a position embedding a barcode according to a color of the barcode and color information of an object into which the barcode is to be embedded; and an arrangement device which arranges the barcode at the position determined by the arrangement determination.

According to the present invention, the barcode is arranged by specifying the position at which the barcode is embedded according to the color of the barcode and the color information of the object into which the barcode is embedded. Therefore, the user can read the barcode into a terminal device owned by the user, without feeling a sense of discomfort.

In order to attain the aforementioned object, the present invention is directed to a barcode creation apparatus, comprising: a color specification device which specifies a color of a barcode according to color information of an object into which the barcode is to be embedded; and a barcode creation device which creates the barcode with the color specified by the color specification device.

According to the present invention, a barcode is created in the specified color by specifying the color of the barcode according to the color information of the position at which the barcode is to be embedded. Therefore, it is possible to prevent the user from feeling such a sense of discomfort.

In order to attain the aforementioned object, the present invention is directed to a barcode creation apparatus which creates a barcode read in by a prescribed terminal device, comprising: a barcode creation device which creates the barcode including a first bitmap and a second bitmap which is arranged exclusively with respect to the first bitmap within the barcode, wherein: the first bitmap is encoded so as to be readable by the terminal device; and the second bitmap depicts a recognizable display which comprises at least one of characters, a figure, a symbol, and a combination thereof.

The present invention is also directed to the barcode creation apparatus wherein the barcode creation device determines at least one of a position of the display and a size of the display, according to a number of bits of the first bitmap.

In order to attain the aforementioned object, the present invention is directed to a barcode creation method comprising the steps of: specifying a function which allows a prescribed terminal device to startup when a barcode is read in, from a plurality of functions that the terminal device has; specifying a color of the barcode, the color representing the specified function; and creating the barcode in the specified color.

In order to attain the aforementioned object, the present invention is also directed to a barcode creation method comprising the steps of: specifying a function which allows a prescribed terminal device to startup when a barcode is read in, from a plurality of functions that the terminal device has; specifying a display which corresponds to the specified function, the display being embedded into at least one of a chromatic part and a black part on the barcode, the display comprising at least one of characters, a figure, a symbol, and a combination thereof and creating the barcode in which the specified display is embedded into an embedding portion of the barcode with at least one of a different color and a different density with respect to the embedding portion, the embedding portion comprising at least one of the chromatic part and the black part on the barcode.

In order to attain the aforementioned object, the present invention is also directed to a barcode creation method comprising the steps of: specifying a function which allows a prescribed terminal device to startup when a barcode is read in, from a plurality of functions that the terminal device has; specifying a display which corresponds to the specified function, the display being embedded into the barcode by blanking out a form of the display to the barcode, the display comprising at least one of characters, a figure, a symbol, and a combination thereof; and creating the barcode that the specified display is embedded by blanking out the form of the display to the barcode.

In order to attain the aforementioned object, the present invention is also directed to a barcode creation method, comprising the steps of: inputting contents of a display which is embedded into a barcode, the display comprising at least one of characters, a figure, a symbol, and a combination thereof; and creating the barcode in which the inputted contents of the display are embedded into an embedding portion of the barcode with at least one of a different color and at a different density from the embedding portion, the embedding portion comprising at least one of a chromatic part and a black part on the barcode.

In order to attain the aforementioned object, the present invention is also directed to a barcode creation method comprising the steps of: inputting contents of a display to be embedded into a barcode, the display comprising at least one of characters, a figure, a symbol, and a combination thereof; and creating the barcode into which the inputted contents of the display are embedded by blanking out a form of the display to the barcode.

In order to attain the aforementioned object, the present invention is also directed to a barcode creation method comprising the steps of: determining a position embedding a barcode according to a color of the barcode and color information of an object into which the barcode is to be embedded; and arranging the barcode at the determined position.

In order to attain the aforementioned object, the present invention is also directed to a barcode creation method comprising the steps of: specifying a color of a barcode according to color information of an object into which the barcode is to be embedded; and creating the barcode in the specified color.

In order to attain the aforementioned object, the present invention is directed to a barcode creation method which creates a barcode read in by a prescribed terminal device, comprising the steps of: generating a first bitmap encoded so as to be readable by the terminal device; and generating a second bitmap which is arranged exclusively with respect to the first bitmap within the barcode, the second bitmap depicting a recognizable display which comprises at least one of characters, a figure, a symbol, and a combination thereof.

The present invention is also directed to the barcode creation method further comprising the steps of: calculating a number of bits in the first bitmap; and determining at least one of a position of the display and a size of the display according to the number of bits thus calculated.

In order to attain the aforementioned object, the present invention is directed to a computer readable medium having embodied thereon a computer program for processing by a computer, the computer program comprising: a first code segment for specifying a function which allows a prescribed terminal device to startup when a barcode is read in, from a plurality of functions that the terminal device has; a second code segment for specifying a color of the barcode, the color representing the specified function; and a third code segment for creating the barcode in the specified color.

In order to attain the aforementioned object, the present invention is directed to a computer readable medium having embodied thereon a computer program for processing by a computer, the computer program comprising: a first code segment for specifying a function which allows a prescribed terminal device to startup when a barcode is read in, from a plurality of functions that the terminal device has; a second code segment for specifying a display which corresponds to the specified function, the display being embedded into at least one of a chromatic part and a black part on the barcode, the display comprising at least one of characters, a figure, a symbol, and a combination thereof; and a third code segment for creating the barcode in which the specified display is embedded into an embedding portion of the barcode with at least one of a different color and a different density with respect to the embedding portion, the embedding portion comprising at least one of the chromatic part and the black part on the barcode.

In order to attain the aforementioned object, the present invention is directed to a computer readable medium having embodied thereon a computer program for processing by a computer, the computer program comprising: a first code segment for specifying a function which allows a prescribed terminal device to startup when a barcode is read in, from a plurality of functions that the terminal device has; a second code segment for specifying a display which corresponds to the specified function, the display being embedded into the barcode by blanking out a form of the display to the barcode, the display comprising at least one of characters, a figure, a symbol, and a combination thereof; and a third code segment for creating the barcode that the specified display is embedded by blanking out the form of the display to the barcode.

In order to attain the aforementioned object, the present invention is directed to a computer readable medium having embodied thereon a computer program for processing by a computer, the computer program comprising: a first code segment for inputting contents of a display which is embedded into a barcode, the display comprising at least one of characters, a figure, a symbol, and a combination thereof; and a second code segment for creating the barcode in which the inputted contents of the display are embedded into an embedding portion of the barcode with at least one of a different color and at a different density from the embedding portion, the embedding portion comprising at least one of a chromatic part and a black part on the barcode.

In order to attain the aforementioned object, the present invention is directed to a computer readable medium having embodied thereon a computer program for processing by a computer, the computer program comprising: a first code segment for inputting contents of a display to be embedded into a barcode, the display comprising at least one of characters, a figure, a symbol, and a combination thereof; and a second code segment for creating the barcode into which the inputted contents of the display are embedded by blanking out a form of the display to the barcode.

In order to attain the aforementioned object, the present invention is directed to a computer readable medium having embodied thereon a computer program for processing by a computer, the computer program comprising: a first code segment for determining a position embedding a barcode according to a color of the barcode and color information of an object into which the barcode is to be embedded; and a second code segment for arranging the barcode at the determined position.

In order to attain the aforementioned object, the present invention is directed to a computer readable medium having embodied thereon a computer program for processing by a computer, the computer program comprising: a first code segment for specifying a color of a barcode according to color information of an object into which the barcode is to be embedded; and a second code segment for creating the barcode in the specified color.

In order to attain the aforementioned object, the present invention is directed to a computer readable medium having embodied thereon a computer program for processing by a computer, the computer program comprising: a first code segment for generating a first bitmap encoded so as to be readable by the terminal device; and a second code segment for generating a second bitmap which is arranged exclusively with respect to the first bitmap within the barcode, the second bitmap depicting a recognizable display which comprises at least one of characters, a figure, a symbol, and a combination thereof.

The present invention is also directed to the medium wherein the medium is a propagated signal.

The present invention is also directed to the medium wherein the propagated signal is a carrier waive.

According to the present invention, it is possible to create a barcode which can be read in to a terminal device that is owned by the user, without the user feeling a sense of discomfort.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a plan view showing an example of a barcode creation management table according to the first embodiment;

FIG. 13 is a plan view showing the setting information of a barcode according to the third embodiment;

FIG. 14A is a plan view showing an example of a bitmap of an original two-dimensional barcode obtained by encoding according to the third embodiment, FIG. 14B is a plan view showing an example of a bitmap of display characters which are displayed by blanking out in a two-dimensional barcode according to the third embodiment, and FIG. 14C is a plan view showing a case where the bitmap of the display characters in FIG. 14B has been embedded by blanking out into the bitmap of the original two-dimensional barcode in FIG. 14A according to the third embodiment;

DETAILED DESCRIPTION OF THE PREFERRED EMBODIMENTS

Figure 1:
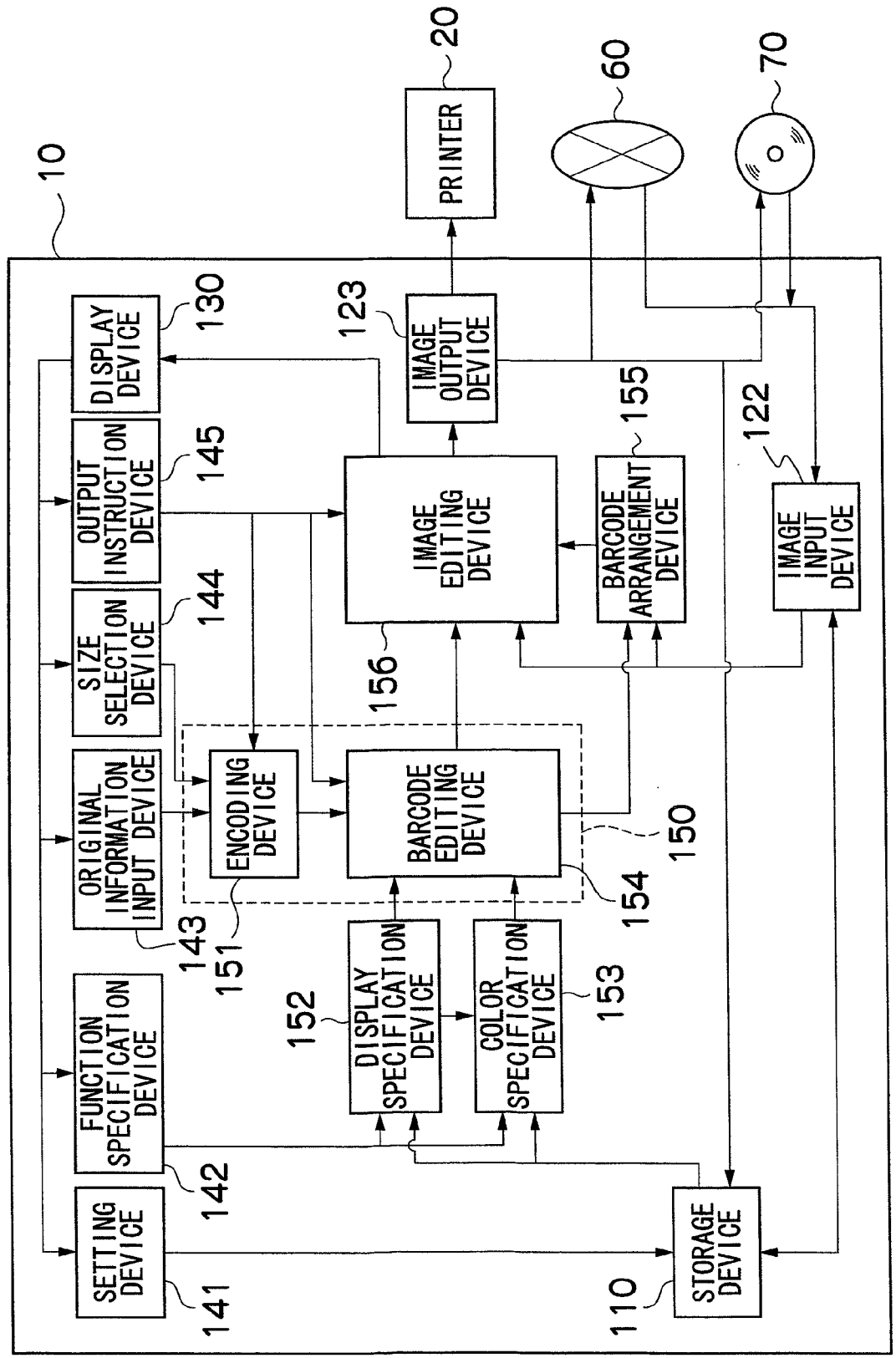
FIG. 1 is a schematic block diagram showing the composition of a barcode creation device according to a first embodiment of the present invention.

FIG. 1 is a schematic block diagram showing the composition of a barcode creating device 10 according to a first embodiment of the present invention.

As shown in FIG. 1, the barcode creation apparatus 10 comprises: a storage device 110; an image input device 122; an image output device 123; a display device 130; a setting device 141; a function specification device 142; an original information input device 143; a size selection device 144; an output instruction device 145; an encoding device 151; a display specification device 152; a color specification device 153; a barcode editing device 154; a barcode arrangement device 155; and an image editing device 156.

The storage device 110 stores a two-dimensional barcode creation program and various types of information necessary in order to create a two-dimensional barcode. In the present embodiment, the storage device 110 stores a management table 1100 as shown in FIG. 4. The management table 1100 shown in FIG. 4 is a table which records following items according to functions of the terminal device which reads in the two-dimensional barcode, which are started up when the two-dimensional barcode is read in: an identifier; a two-dimensional barcode color (barcode color); a display character embedded in the two-dimensional barcode; a display mark embedded in the two-dimensional barcode; a color of the display character and display mark (a display color); and other information relating to the two-dimensional barcode.

The image input device 122 is a device which inputs the image into which the two-dimensional barcode is to be embedded.

The image output device 123 is a device which outputs an image into which a two-dimensional barcode has been embedded. In the present embodiment, possible output destinations of the image include: a printer 20, a network 60, a detachable storage medium 70, and an internal storage device 110.

The display device 130 provides various types of displays, such as screens for providing guidance to the user, a display of the image into which the two-dimensional barcode is to be embedded, a display of the two-dimensional barcode, a display of an image into which the two-dimensional barcode has been embedded, and other types of information.

The setting device 141 sets various types of information necessary for creating a two-dimensional barcode. In the present embodiment, the setting device 141 is used when setting up a management table 1100 as shown in FIG. 4.

The function specification device 142 specifies the function to be started up in the terminal device when the created two-dimensional barcode is read in, from the plurality of functions belonging to the terminal device which reads in the two-dimensional barcode. For specifying the function, there are a first mode that the user selects a function from a plurality of functions displayed on the display device 130, and a second mode that the function is specified by determining an identifier contained in the original information that is encoded.

The original information input device 143 inputs the original information that is to be encoded as a two-dimensional barcode. The original information is a URL (Uniform Resource Locator), an electronic mail address, text, sound information, or the like, for example.

The size selection device 144 selects the size of two-dimensional barcode.

The output instruction device 145 serves to input an output mode and an output instruction for the two-dimensional barcode. For example, the output mode for the two-dimensional barcode is a print output onto a paper by outputting to a printer 20, a file output to the storage medium 70 or the storage device 110, a screen display output to the display device 130, or an output made via the network 60.

The encoding device 151 encodes the original information inputted by the original information input device 143, in accordance with a prescribed standard, and it thereby generates an original two-dimensional barcode formed by a black and white bit-map arranged in a two-dimensional matrix shape.

The display specification device 152 specifies the display characters and display marks to be embedded in the original two-dimensional barcode, by referring to the management table 1100 and reading out the display characters and display marks corresponding to the function specified by the function specification device 142.

The color specification device 153 specifies the color of the two-dimensional barcode (the barcode color) and the color of the display text and display marks (the display color), by reading in the barcode color and the display color corresponding to the function specified by the function specification device 142, according to the management table 1100.

The barcode editing device 154 edits the original two-dimensional barcode generated by the encoding device 151. More specifically, firstly, it sets the color of the two-dimensional barcode. Secondly, if there are display characters which are to be embedded, then it embeds those display characters in the original two-dimensional barcode. Thirdly, if there are display marks which are to be embedded, then it embeds those display marks in the original two-dimensional barcode. Finally, it sets the colors of the display characters and display marks. Furthermore, it needs to set the color of the two-dimensional barcode and the colors of the display characters and the display marks to the colors which do not impede the identification of the bitmap when the two-dimensional barcode is decoded in the terminal device. For example, it is preferable to use the darkly colors such as red, green, blue, and black.

Further, it is also possible to set the color of the two-dimensional barcode to black while setting the color of the display characters or the display marks to a half-tone which has a lighter density than black. In this case, it needs to set the density of the half-tone to a density that does not impede the identification of the bitmap when the two-dimensional barcode is decoded by the terminal device.

The barcode arrangement device 155 decides the position at which the two-dimensional barcode is to be embedded in the image, according to the color of the two-dimensional barcode after editing and the color information of the image into which the two-dimensional barcode is to be embedded. In addition, the barcode may be embedded at a prescribed position which is previously established in the white margin of the image.

The image editing device 156 generates the image to be outputted by embedding the two-dimensional barcode in the image.

In FIG. 1, the encoding device 151 and the barcode editing device 154 constitute a two-dimensional barcode creation device 150.

Figure 2:
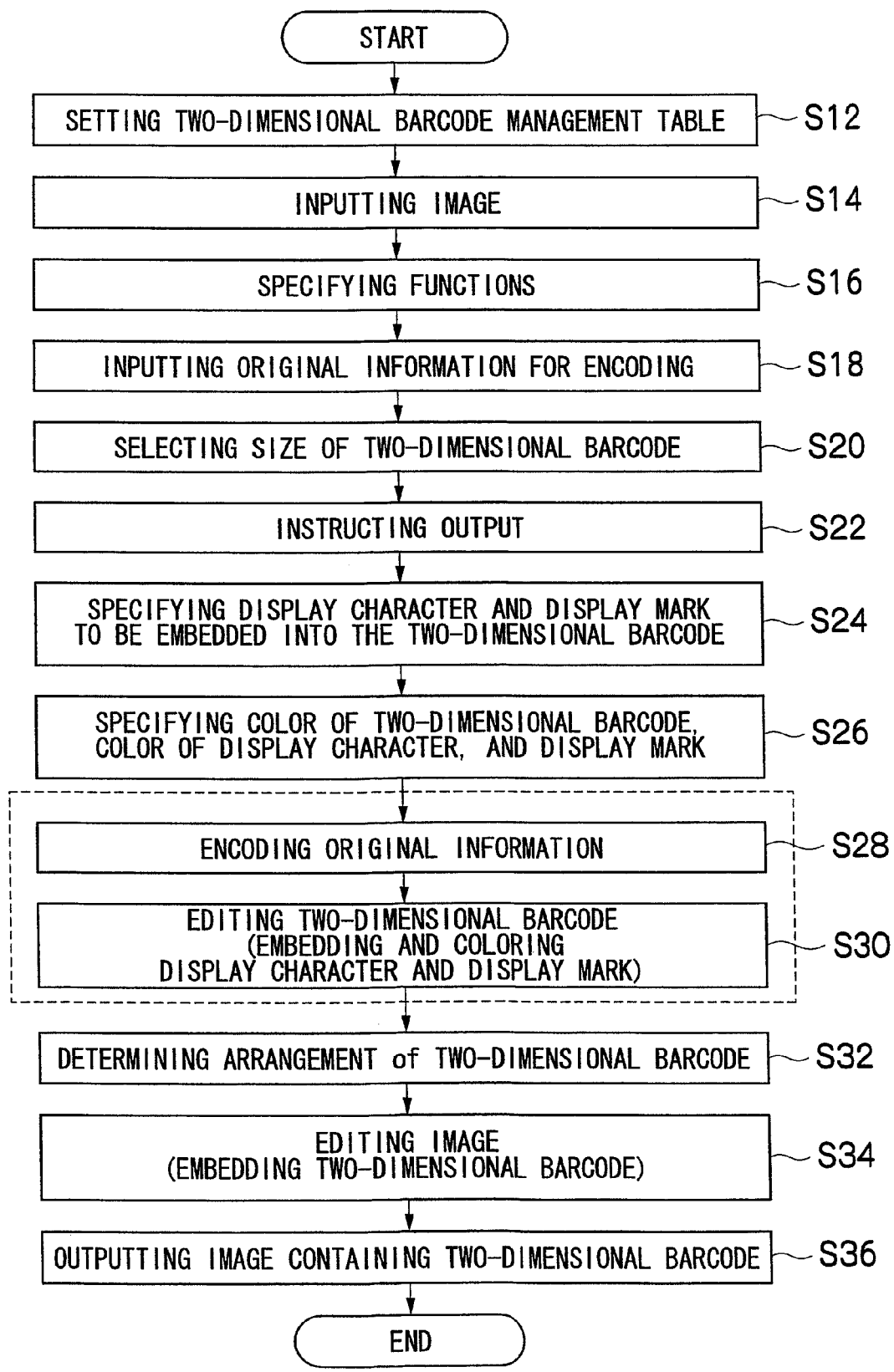
FIG. 2 is a flow diagram showing a sequence of processing for creating a barcode according to the first embodiment.

Next, the sequence of processing for creating a two-dimensional barcode according to the first embodiment is described with reference to FIG. 2.

In the following description, the barcode creation apparatus 10 is composed of a computer apparatus which implements a two-dimensional barcode creation tool (as a program). In addition, the terminal device that reads in the two-dimensional barcode is composed of a mobile telephone with a built-in camera.

Figure 3:
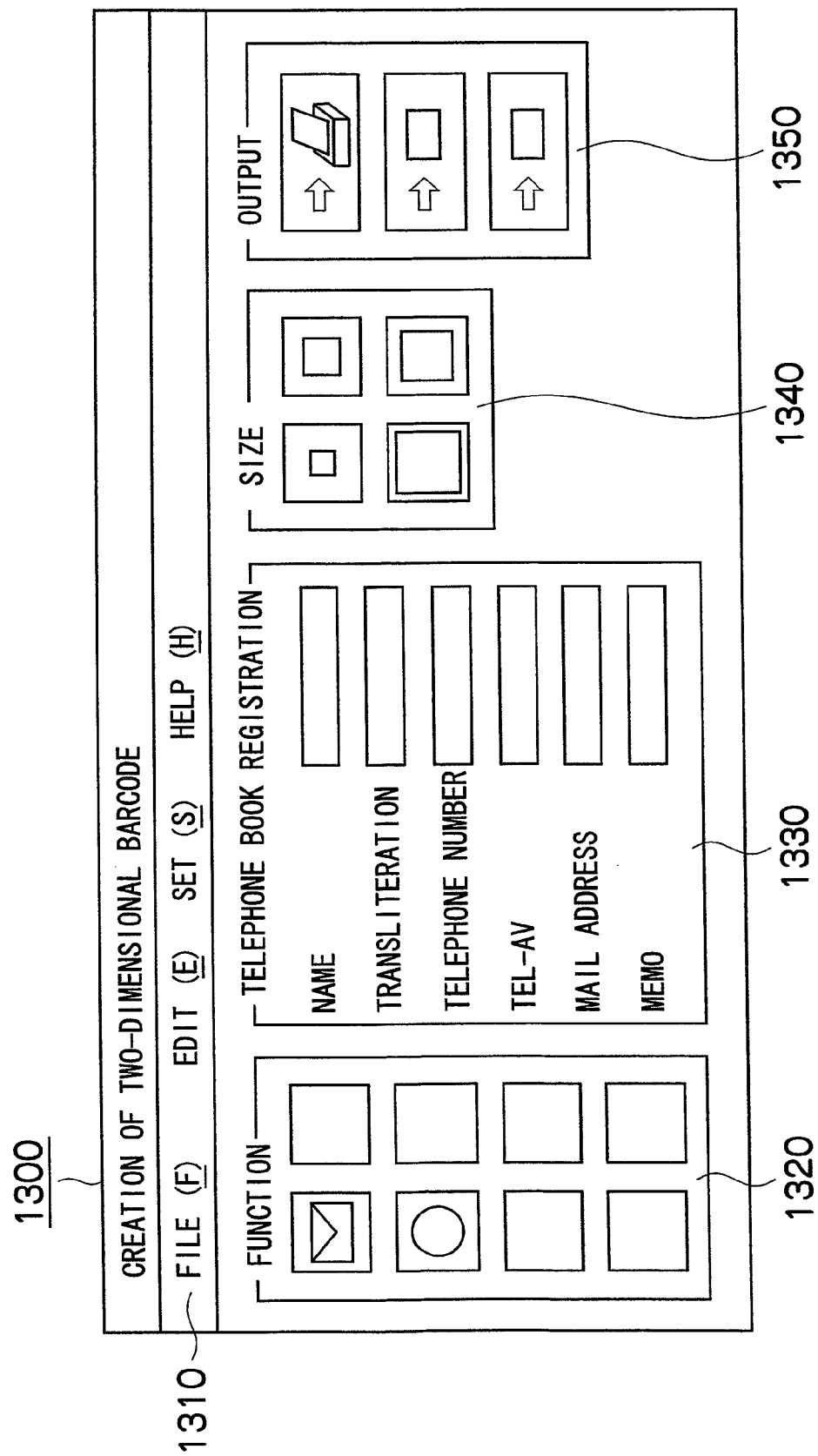
FIG. 3 is a plan view showing an example of a barcode creation screen according to the first embodiment.

First, the two-dimensional barcode management table 1100 is set up (S12). More specifically, when the two-dimensional barcode creation tool is started up by the computer apparatus, a two-dimensional barcode creation screen 1300 shown in FIG. 3 is displayed at the computer, and then the "Set Up" is selected from the menu bar 1310 at the top of the screen. At this time, since a screen (a set-up screen) for setting up a two-dimensional barcode management table 1100 is displayed, operations for setting up the management table 1100 are performed via the set-up screen.

As shown in FIG. 4, the management table 1100 is a table which specifies an identifier, barcode color, display characters, display marks, and a display color, according to functions that are activated by the mobile telephone when it reads in a two-dimensional barcode.

Herein, the management table 1100 registers the following functions: a "mail" function; a "Web" function; a "telephone book registration" function; a "book mark registration" function; a "text registration" function; a "content registration" function; an "application link" function; and other functions. The "mail" function is a function linked to an electronic mail program of the mobile telephone, and displays an electronic mail transmission form on the mobile telephone. The "Web" function is a function which starts up a browser program of the mobile telephone, and accesses from the mobile telephone a WWW (World Wide Web) server on the Internet, while reproducing digital contents delivered by the WWW server. The "telephone book registration" function is a function which registers telephone numbers and other personal information in a telephone book contained within the mobile telephone. The "book mark registration" function is a function which registers the URL (Uniform Resource Locator) of a homepage on the Internet as a book mark in the mobile telephone. The "text registration" function is a function which registers text information encoded in the two-dimensional barcode, in the mobile telephone. The "contents recognition" function is a function which allows the mobile telephone to recognize contents encoded in the two-dimensional barcode as digital contents. The "application" function is a function which links to a downloadable application program, such as an "i-application" (registered trademark), recorded on the mobile telephone.

The "identifier" is an element which should be included in the original information that is encoded in the two-dimensional barcode, and an element capable of identifying the respective functions is set. For example, "mailto:" is an identifier for the "mail" function. Furthermore, "http://" is an identifier for the "Web" function.

The "barcode color" is the color of the two-dimensional barcode, and is set to a color corresponding to the respective functions. For example, the "mail" function is set to blue, and the "Web" function is set to red.

The "display characters" are characters displayed in the two-dimensional barcode, and are set so as to correspond to the respective functions. For example, the "mail" function is set to "M" which is the first letter of "Mail", and the "Web" function is set to "W" which is the first letter of "Web".

The "display marks" are marks (figures or symbols) displayed in the two-dimensional barcode, and are set so as to correspond with the respective functions. For example, the "mail" function is set to a figure representing a post office.

The "display color" sets the color of the display characters or display marks shown in the two-dimensional barcode. This color is set to black, for example.

As described above, when a prescribed registration operation has been carried out after inputting the contents of the management table, the inputted contents are stored in a storage device 110 of the computer apparatus.

Incidentally, the set up of the management table (S12) does not have to be carried out if a management table 1100 has already been established.

Next, an image, which forms the object into which the two-dimensional barcode will be embedded, is inputted (S14). This inputted image is a still image taken, for instance, by the user with a digital camera or mobile telephone having a built-in camera.

Next, the function activated by the mobile telephone when the two-dimensional barcode is read in to the mobile telephone is selected (S16). More specifically, a plurality of functional icons are displayed on the functional selection area 1320 of the two-dimensional barcode creation screen 1300 shown in FIG. 3, and therefore, an icon which represents the function corresponding to the two-dimensional barcode is selected from those functional icons. At this time, the input fields corresponding to the selected function are displayed on the input region 1330 of the two-dimensional barcode creation screen 1300.

The two-dimensional barcode creation screen 1300 in FIG. 3 shows a case where the "telephone book registration" function has been selected. In addition, the input region 1330 displays the input fields such as "name", "transliteration", "telephone number", "video telephone no.", "e-mail address", and "memo". At this time, if the "mail" function has been selected, then the input region 1330 displays an input field for inputting the e-mail address of the recipient, an input field for inputting an e-mail template, and the like. Furthermore, if the "Web" function has been selected, then the input region 1330 displays an input field for inputting the URL of a WWW server, an input field for inputting variables which are to be reported to the WWW server, and the like.

At this time, the original information to be encoded as a two-dimensional barcode is inputted (S18).

Incidentally, the user does not need to input all of the original information. For example, in the case of a "mail" function, the "mailto:" which is set as the "identifier" in the management table, is automatically read out and added before the information inputted by the user. In addition, in the case of a "Web" function, the information "http://", which is set as the "identifier" in the management table, is read out and added before the information inputted by the user.

Furthermore, the original information is not limited in particular to being inputted via the screen. For example, it is also possible to read out the original information from a desired file.

Next, the size of the two-dimensional barcode is selected (S20). More specifically, the selectable size of the two-dimensional barcode is displayed on the size selection region 1340 of the two-dimensional barcode creation screen 1300, and therefore, a size is selected from the plurality of sizes displayed. If the default size is acceptable, then the size selection operation does not have to be performed.

Next, an output instruction is specified (S22). In the output instruction region 1350 of the two-dimensional barcode creation screen 1300 in FIG. 3, it is preferable to specify the output instructions at the same time as the output mode such as printer output, file output, screen display, and the like.

Next, when an output instruction is issued, the display characters and the display marks to be embedded in the two-dimensional barcode are specified (S24). More specifically, the display characters and the display marks corresponding to the specified function are read out according to the management table 1100.

If only the two-dimensional barcode is colored, then display characters and display marks are not set in the management table 1100. Therefore, it is judged that there are no display characters or display marks to be embedded in the two-dimensional barcode. Additionally, if only a display character (for example, "M") is embedded, then no display mark is set in the management table 1100. Therefore, it is judged that there is no display mark that is to be embedded in the two-dimensional barcode. Furthermore, if only a display mark (for example, a post office mark) is embedded, then no display character is set in the management table 1100. Therefore, it is judged that there is no display character that is to be embedded in the two-dimensional barcode.

Next, the color of the two-dimensional barcode and the color of the display character and the display mark are specified (S26). More specifically, the color of the two-dimensional barcode (the barcode color) corresponding to the specified function, and the color of the display characters and the display marks (the display color) are read out according to the management table 1100.

If the "barcode color" has not been set in the management table 1100, then it is judged that the two-dimensional barcode is not to be colored. In this case, the two-dimensional barcode is set the color to black.

Next, the original information is encoded (S28). For example, if the function is "mail" and the original information is "mailto:XXXX", then this original information is encoded according to a prescribed format that is standardized with the QR code (registered trademark), and hence a bitmap of an original two-dimensional barcode shown in FIG. 5A is created.

Next, the two-dimensional barcode is edited (S30). For example, if the function is "mail" and the "barcode color" associated with the "mail" function in the management table 1100 is blue, then the color of the two-dimensional barcode is set to blue. In addition, if the "display character" associated with the "mail" function in the management table 1100 is the "M" and the "display color" is black, then the "M" is embedded with black, into the two-dimensional barcode. Furthermore, if the "display mark" associated with the "mail" function in the management table 1100 is a post office mark and the "display color" is black, then the post office mark is embedded with black, into the two-dimensional barcode.

Figure 5D:
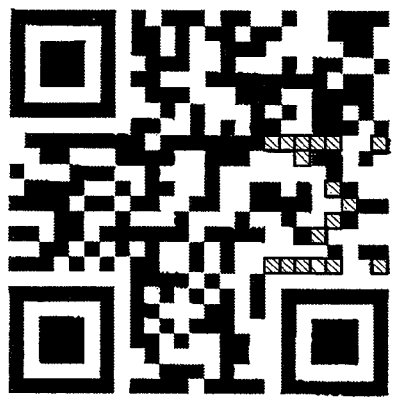
FIG. 5A is a plan view of a bitmap of an original two-dimensional barcode according to the first embodiment.
FIG. 5B is a plan view showing an example of a bitmap of a display character.
FIG. 5C shows a case where the bitmap of the display character in FIG. 5B has been embedded into the bitmap of the original two-dimensional barcode in FIG. 5A, FIG. 5D a plan view showing another example of a bitmap of a display mark.
FIG. 5E a plan view showing a case where this bitmap of the display mark in FIG. 5D has been embedded into the bitmap of the original two-dimensional barcode in FIG. 5A.
Figure 5E:
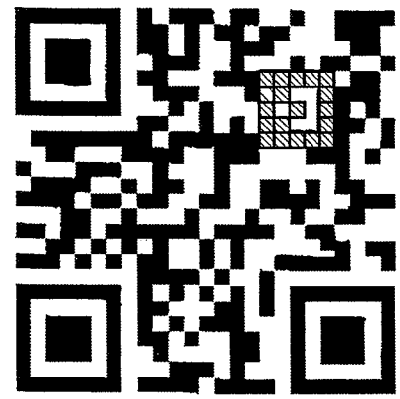
Figure 5B:
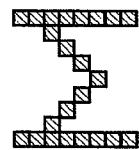
Figure 5C:
Figure 5A:
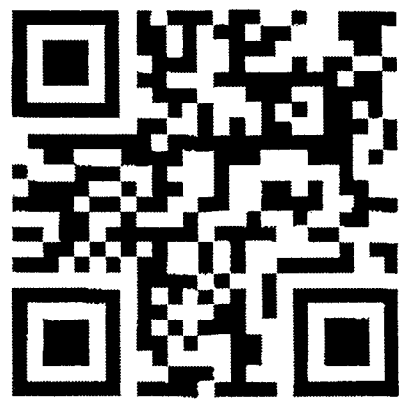

FIG. 5B shows an example of a bitmap of a display character; and FIG. 5C shows a case where the bitmap of the display character has been embedded into the bitmap of the original two-dimensional barcode in FIG. 5A. Herein, the two-dimensional barcode is blue, and the display character is black. Furthermore, FIG. 5D shows an example of a bitmap of a display mark; and FIG. 5E shows a case where this bitmap of the display mark has been embedded into the bitmap of the original two-dimensional barcode in FIG. 5A. Herein, the two-dimensional barcode is blue and the display mark is black.

As shown in FIGS. 5C and 5E, the display character and the display mark are embedded into the chromatic part of the two-dimensional barcode (or the black part thereof), in a different color to the chromatic part (or the black part). On the other hand, the display character and the display mark are not embedded into the non-chromatic part (or the white part) of the two-dimensional barcode. Thereby, it is possible to avoid impeding the identification of the two-dimensional barcode by the portable telephone when it reads in the two-dimensional barcode.

Incidentally, FIG. 5C shows a case where only the display character "M" is embedded in the two-dimensional barcode, and FIG. 5E shows a case where only a display mark (post office mark) is embedded in the two-dimensional barcode. However, it is also possible to embed both a display character ("M") and a display mark ("post office mark") in the same two-dimensional barcode, according to the settings in the management table 1100.

Next, the arrangement of the two-dimensional barcode is determined (S32), and editing for embedding the two-dimensional barcode in the image is carried out (S34). More specifically, the position at which to embed the two-dimensional barcode is determined according to the color of the two-dimensional barcode and the color information of the image into which the two-dimensional barcode is to be embedded, and then the two-dimensional barcode is embedded into the image. For example, the image is scanned by blocks corresponding to the shape of the two-dimensional barcode, to retrieve a block having a range of color tone equal to or less than a prescribed value (i.e. a block having a homogeneous internal color) which is also the closest in color tone to the color of the two-dimensional barcode (for example, blue). The two-dimensional barcode is embedded in the block thus found by retrieving. For example, if the two-dimensional barcode is blue, then the two-dimensional barcode is embedded into a blue part of the image. In addition, the two-dimensional barcode may also be embedded into a fixed position in the margin of the image.

Then, the image containing the two-dimensional barcode is outputted (S36). In the case of a print output, the image embedded with the two-dimensional barcode is sent to the printer 20, where it is printed onto prescribed paper, thereby creating a so-called "photographic print". Displaying a screen is performed before this print output, thereby making it possible to verify the image containing the embedded two-dimensional barcode, on the screen of the computer apparatus. Furthermore, in the case of a file output, an image embedded with a two-dimensional barcode is outputted to a storage medium 70 or to a storage device 110 of the computer apparatus, and hence it can be saved as a file.

Figure 6A:
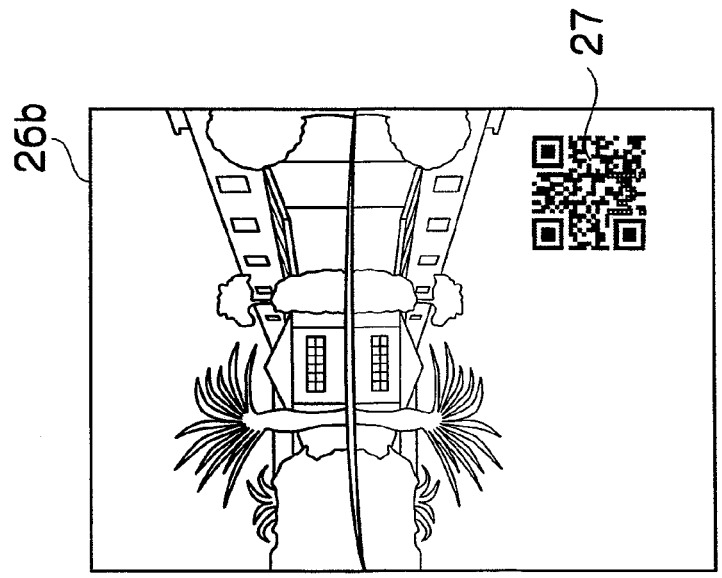
FIG. 6A is a plan view showing a photographic print in a case where a two-dimensional barcode has been embedded at a fixed position in the margin of an image according to the first embodiment.
Figure 6B:
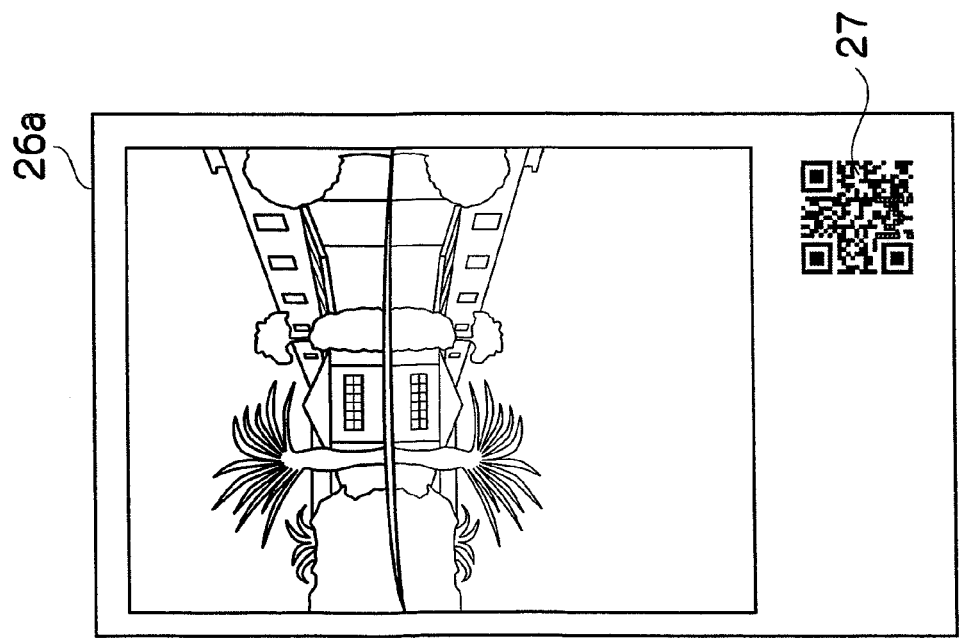
FIG. 6B is a plan view showing a photographic print in a case where a two-dimensional barcode 27 been embedded into the area of the input image according to the first embodiment.

FIG. 6A shows a photographic print 26a in a case where a two-dimensional barcode 27 has been embedded at a fixed position in the margin of an image, and FIG. 6B shows a photographic print 26b in a case where a two-dimensional barcode 27 has been embedded into the area of the input image. Herein, the color of the two-dimensional barcode 27 is blue, and a two-dimensional barcode 27 has been embedded into a blue part of the input image in FIG. 6B.

As described above, an example is described in which the two-dimensional barcode is outputted by being embedded into an image, but it is also possible to output the two-dimensional barcode only.

In addition, an example is described in which the color of the two-dimensional barcode is set, and a display character and a display mark are embedded into the two-dimensional barcode, in accordance with the function of the terminal device, but it is also possible to set the color of the two-dimensional barcode only in accordance with the function, without embedding a display character or display mark in the two-dimensional barcode. Furthermore, it is also possible to embed only a display character in the two-dimensional barcode, or to embed only a display mark in the two-dimensional barcode, without setting the color of the two-dimensional barcode. Moreover, it is also possible to blank out the two-dimensional barcode by means of the display character or the display mark, instead of embedding the display character or display mark into the two-dimensional barcode.

Figure 7:
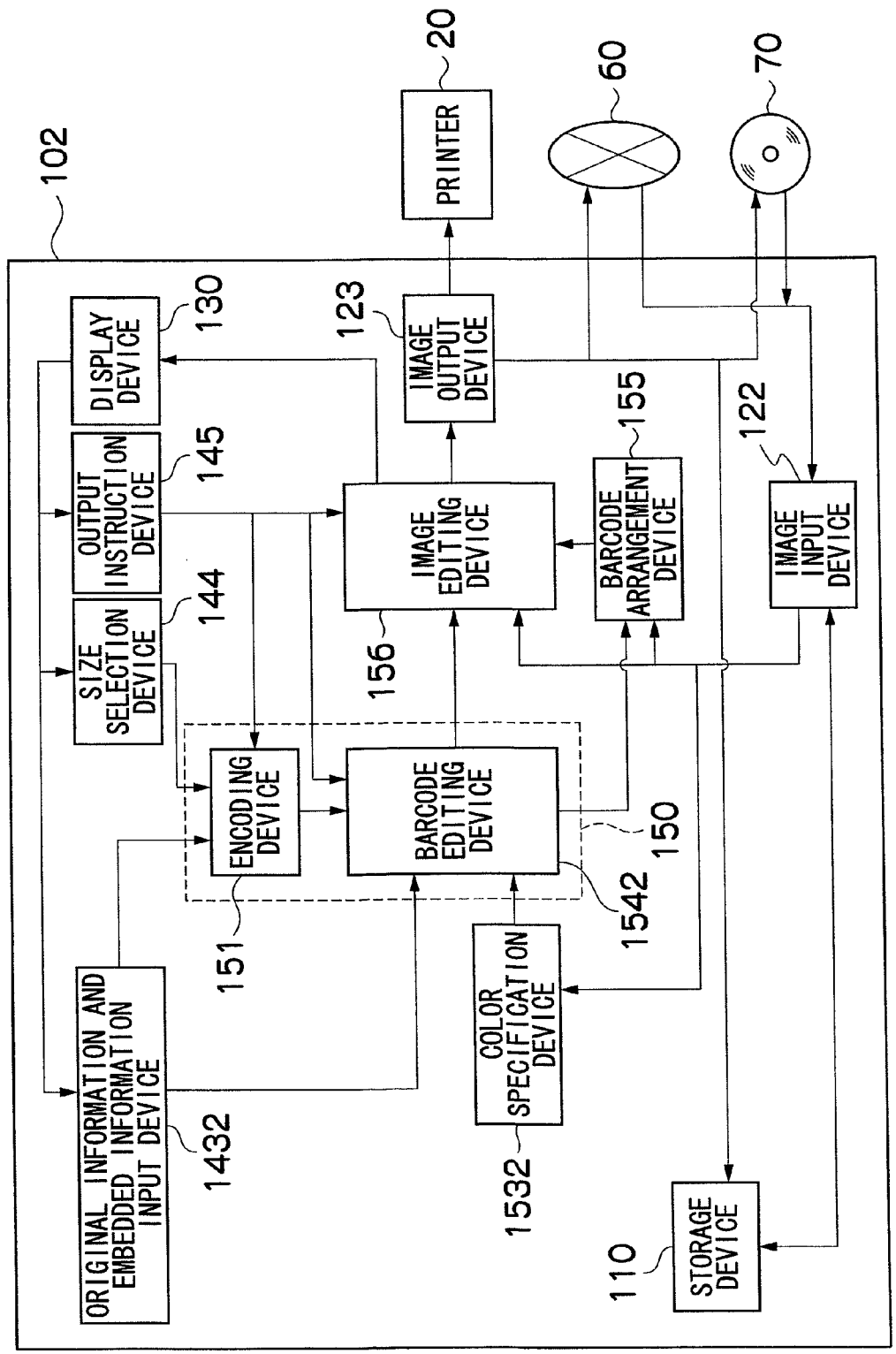
FIG. 7 is a schematic block diagram showing the composition of a barcode creation device according to a second embodiment of the present invention.

FIG. 7 is a schematic block diagram showing the composition of a barcode creation device 102 according to a second embodiment of the present invention. As shown in FIG. 7, the barcode creation apparatus 102 comprises: a storage device 110; an image input device 122; an image output device 123; a display device 130; an original information and embedded information input device 1432; a size selection device 144; an output instruction device 145; an encoding device 151; a color specification device 1532; a barcode editing device 1542; a barcode arrangement device 155; and an image editing device 156. In FIG. 7, the same compositional elements as those of the barcode creation apparatus 10 according to the first embodiment shown in FIG. 1 are labeled with the same reference numerals and detailed description thereof is omitted here, because they have been described above in relation to the first embodiment.

The original information and embedded information input device 1432 is a device which inputs the original information to be encoded as a two-dimensional barcode, and the embedded information to be embedded in the two-dimensional barcode (including at least one of a display character and a display mark). The color specification device 1532 is a device which specifies the color of the two-dimensional barcode, according to the color information of the object into which the two-dimensional barcode is to be embedded. The barcode editing device 1542 is a device which embeds the embedded information into the original two-dimensional barcode, when there is information to be embedded.

Figure 8:
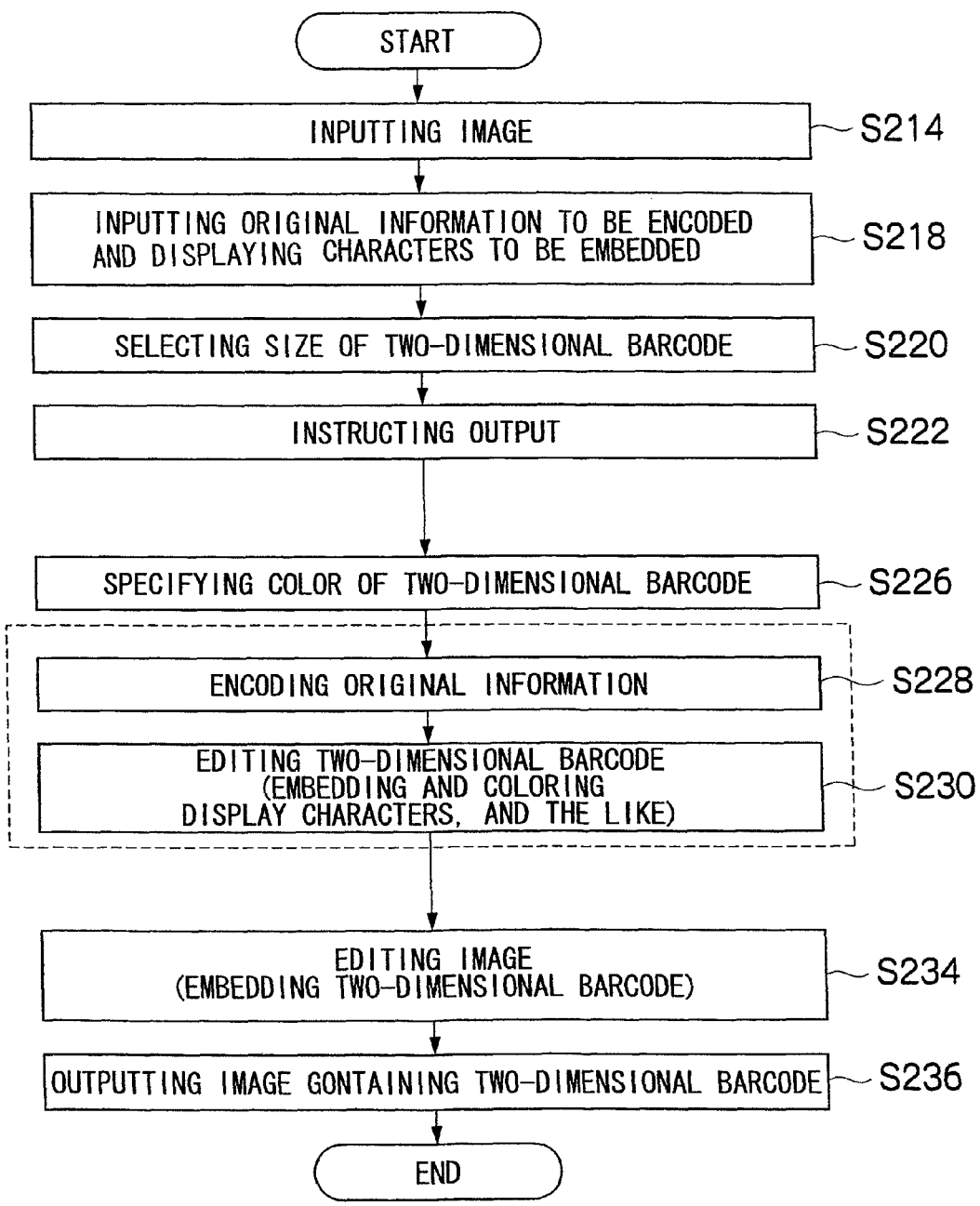
FIG. 8 is a flow diagram showing a sequence of processing for creating a barcode according to the second embodiment.

Next, the sequence of processing for creating a two-dimensional barcode according to the second embodiment is described with reference to FIG. 8.

First, an image, which forms the object into which the two-dimensional barcode is embedded, is inputted (S214). This inputted image is a still image taken, for instance, by the user with a digital camera or a portable telephone having a built-in camera.

Next, the original information to be encoded as a two-dimensional barcode, and the embedded information to be displayed by embedding in the two-dimensional barcode are inputted (S218).

Figure 9:
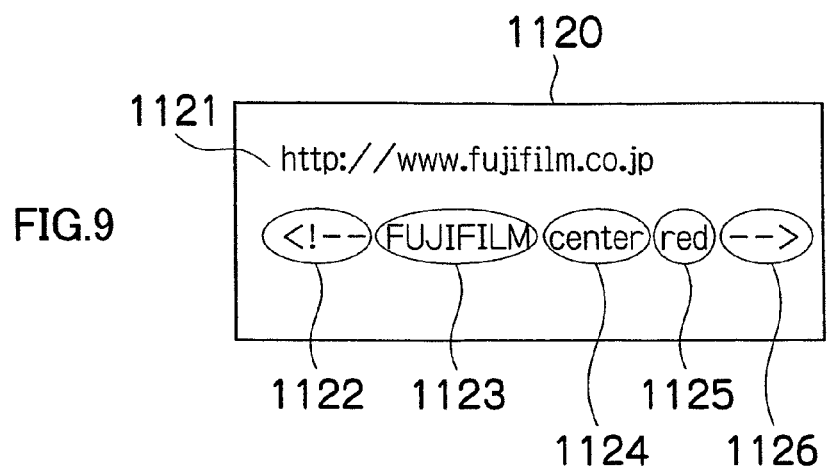
FIG. 9 is a plan view showing the setting information of a barcode according to the second embodiment.

FIG. 9 shows an example of setting information 1120 which combines both the original information and the embedded information. In FIG. 9, the information "http://www.fujifilm.co.jp" is the original information 1121 which is to be encoded. The division start information 1122 indicates the start of the information to be embedded. Following the positioned after this division start information 1122, there are placed: display characters ("FUJIFILM") 1123 which are to be displayed by embedding in the two-dimensional barcode; embedding position information 1124 which indicates the embedding position in the two-dimensional barcode; display color information 1125 which indicates the color of the display characters 1123 to be embedded; and division end information 1126. Such the setting information 1120 is inputted to the computer apparatus.

Next, the size of the two-dimensional barcode is selected (S220), and an output instruction is issued (S222). Herein, as possible output modes, there are a printer output, a file output, a display screen, a network output, and the like.

Next, when an output instruction has been issued, the color of the two-dimensional barcode is specified according to the color information of the image into which the two-dimensional barcode is to be embedded (S226), whereupon the original information is encoded (S228), and then the two-dimensional barcode is edited (S230).

Figure 10A:
FIG. 10A is a plan view showing an example of a bitmap of an original two-dimensional barcode obtained by encoding.
Figure 10B:
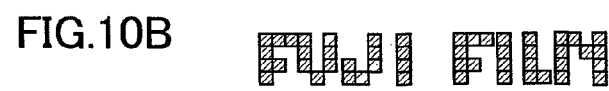
FIG. 10B is a plan view showing an example of a bitmap of display characters which are displayed by being embedded into a two-dimensional barcode.

FIG. 10A shows an example of a bitmap of an original two-dimensional barcode obtained by encoding. FIG. 10B shows an example of a bitmap of display characters which are displayed by being embedded into a two-dimensional barcode, and FIG. 10C shows a case where the bitmap of the display characters in FIG. 10B has been embedded into the bitmap of the original two-dimensional barcode in FIG. 10A.

Incidentally, the position for embedding the two-dimensional barcode may be a fixed position (for example, a previously determined prescribed position in the white margin of the image). Alternatively, the two-dimensional barcode may be embedded in a part of the image where the color of the image is homogenous. For example, the image is scanned by blocks corresponding to the shape of the two-dimensional barcode, a block having a color tone range equal to or less than a prescribed value is found (i.e. a block where the color of the image is homogenous), and the two-dimensional barcode is embedded into this block. In this case, if the part of the image into which the two-dimensional barcode is to be embedded is blue, then the two-dimensional barcode is also set to be blue.

Figure 10C:
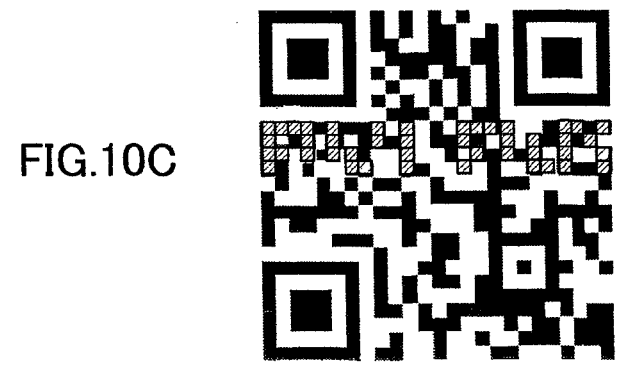
FIG. 10C is a plan view showing a case where the bitmap of the display characters in FIG. 10B has been embedded into the bitmap of the original two-dimensional barcode in FIG. 10A.

Furthermore, as shown in FIG. 10C, the display character and the display mark are embedded in the chromatic part of the two-dimensional barcode (or the black part thereof), in a different color to this chromatic part (or black part). On the other hand, the display character and the display mark are not embedded into the non-chromatic part (or the white part) of the two-dimensional barcode. Thereby, it is possible to avoid impeding the identification of the two-dimensional barcode by the portable telephone when it reads in the two-dimensional barcode.

Next, editing is performed in order to embed the two-dimensional barcode into the image (S234), and then an image containing the two-dimensional barcode is outputted (S236).

Figure 11:
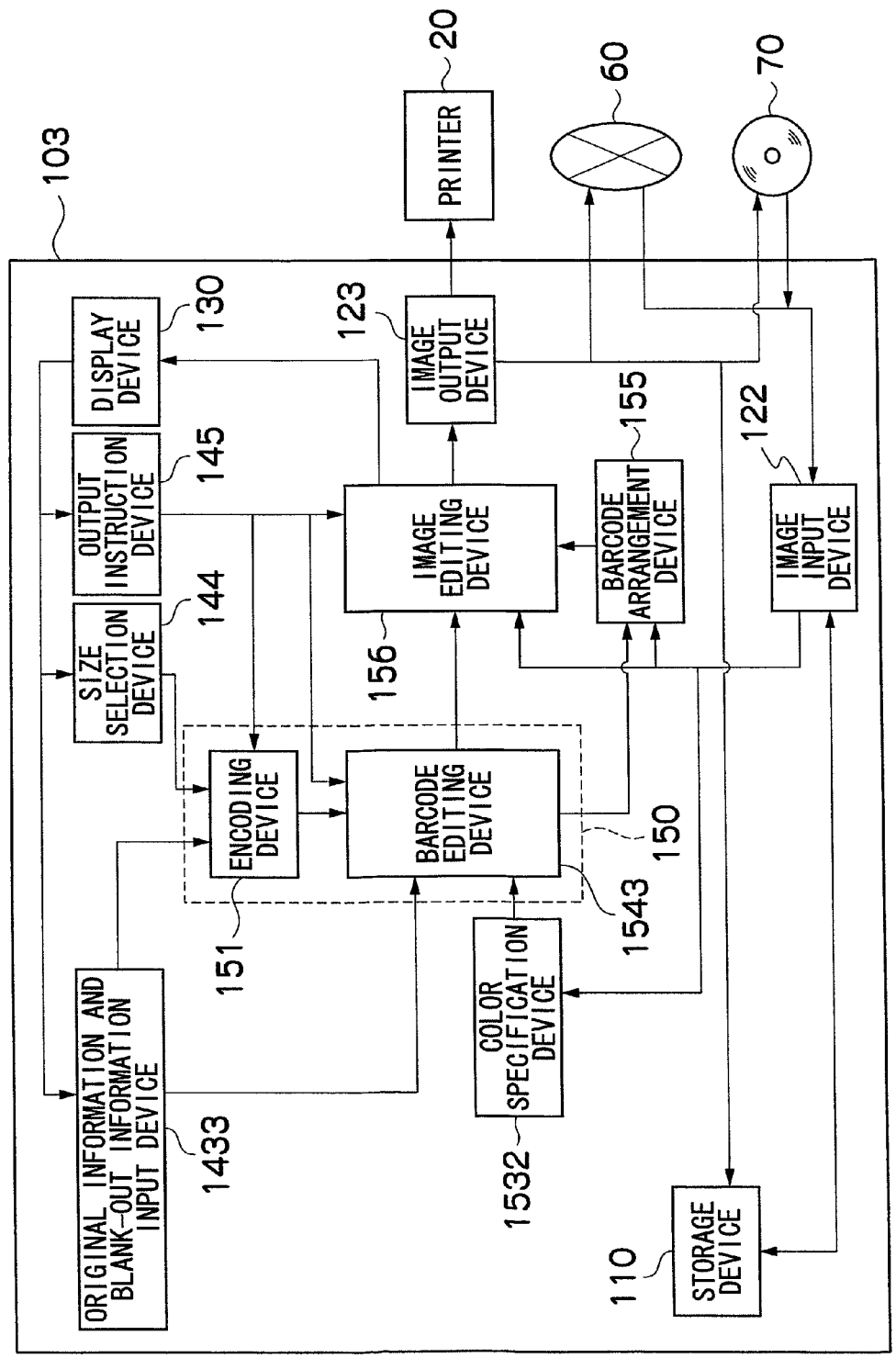
FIG. 11 is a schematic block diagram showing the composition of a barcode creation device according to a third embodiment of the present invention.

FIG. 11 is a schematic block diagram showing the composition of a barcode creation device 103 according to a third embodiment of the present invention. As shown in FIG. 11, the barcode creation apparatus 103 comprises: a storage device 110; an image input device 122; an image output device 123; a display device 130; an original information and blank-out information input device 1433; a size selection device 144; an output instruction device 145; an encoding device 151; a color specification device 1532; a barcode editing device 1543; a barcode arrangement device 155; and an image editing device 156. In FIG. 11, the same compositional elements as those of the barcode creation apparatus 10 according to the first embodiment shown in FIG. 1 are labeled with the same reference numerals and detailed description thereof is omitted here, because they have been described above in relation to the first embodiment.

The original information and blank-out information input device 1433 is a device which inputs the original information which is to be encoded as a two-dimensional barcode, and the blank-out information which is to blank out the two-dimensional barcode (including at least one of a display character and a display mark). The color specification device 1532 is a device which specifies the color of the two-dimensional barcode, according to the color information of the object into which the two-dimensional barcode is to be embedded. The barcode editing device 1543 is a device which blanks out the original two-dimensional barcode by means of the blank-out information, if there is blank-out information.

Figure 12:
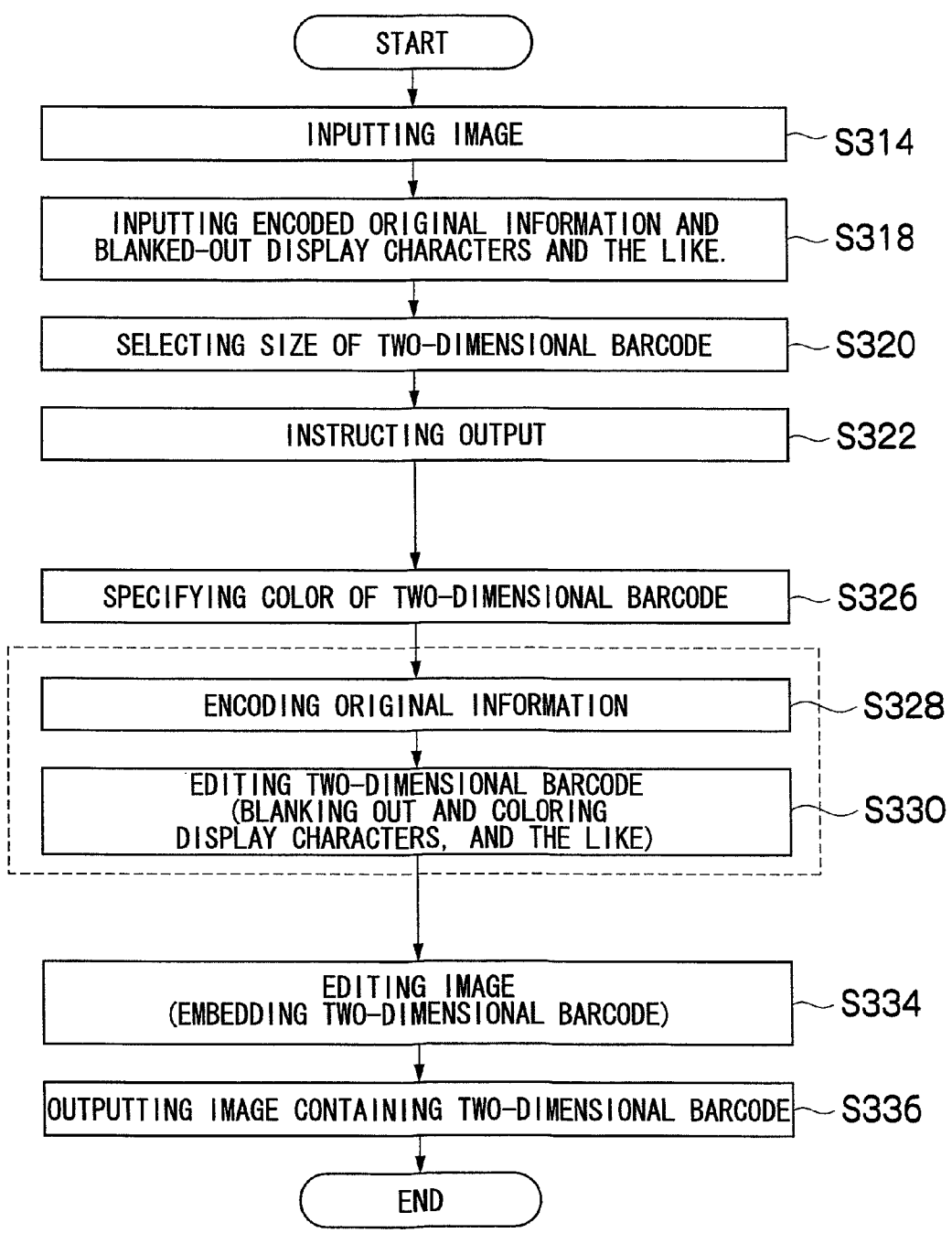
FIG. 12 is a flow diagram showing a sequence of processing for creating a barcode according to the third embodiment.

Next, the sequence of processing for creating a two-dimensional barcode according to the third embodiment is described with reference to FIG. 12.

First, an image, which forms the object to be blanked out in the two-dimensional barcode, is inputted (S314). This inputted image is a still image taken, for instance, by the user with a digital camera or a portable telephone having a built-in camera.

Next, the original information to be encoded as a two-dimensional barcode, and the blank-out information to be displayed by blanking out in the two-dimensional barcode are inputted (S318).

FIG. 13 shows an example of setting information 1130 which combines both the original information and the blank-out information. In FIG. 13, the information "http://www-.fujifilm.co.jp" is the original information 1131 which is to be encoded. The division start information 1132 indicates the start of the blank-out information. Following this division start information 1132, there are placed the display characters 1133 ("FUJI") which are to be displayed by blanking out in the two-dimensional barcode, and division end information 1136. Such the setting information 1130 is inputted to the computer apparatus.

Next, the size of the two-dimensional barcode is selected (S320), and an output instruction is issued (S322). Herein, as possible output modes, there are a printer output, a file output, a display screen, a network output, and the like.

Next, when an output instruction has been issued, the color of the two-dimensional barcode is specified according to the color information of the image of the two-dimensional barcode which is to be blanked out (S326), whereupon the original information is encoded (S328), and then the two-dimensional barcode is edited (S330).

FIG. 14A shows an example of a bitmap of an original two-dimensional barcode obtained by encoding. FIG. 14B shows an example of a bitmap of display characters which are displayed by blanking out in a two-dimensional barcode, and FIG. 14C shows a case where the bitmap of the display characters in FIG. 14B has been embedded by blanking out into the bitmap of the original two-dimensional barcode in FIG. 14A.

Incidentally, the position for embedding the two-dimensional barcode may be a fixed position (for example, a previously determined prescribed position in the white margin of the image). Alternatively, the two-dimensional barcode may be embedded in a part of the image where the color of the image is homogenous. For example, the image is scanned by blocks corresponding to the shape of the two-dimensional barcode. If a block having a color tone range equal to or less than a prescribed value is found (i.e. a block where the color of the image is homogenous), then the two-dimensional barcode is embedded into this block. In this case, if the part of the image into which the two-dimensional barcode is to be embedded is blue, then the two-dimensional barcode is also set to be blue.

FIG. 14C shows the example in which the display characters ("FUJI") are embedded by blanking out at a fixed position in a surplus portion of the two-dimensional barcode, but the position blanked out by the display characters may also be set in the setting information 1130.

Next, editing is performed in order to embed the two-dimensional barcode into the image (S334), and then an image containing the two-dimensional barcode is outputted (S336).

As modes (display modes) for depicting a display recognizable to a human observer on the two-dimensional barcode, which the display comprises characters, a figure, a symbol or a combination thereof, FIG. 5 and FIG. 10 show examples that the display is embedded by being superimposed only over the chromatic portion of a bitmap encoded so as to be readable by a terminal device such as a mobile telephone. In addition, FIG. 14 shows an examples that the display is embedded by blanking out only over the surplus portion where no valuable information is present. Those examples are for the purpose of facilitating understanding of the principles of the present invention, and the display mode according to the present invention is not limited to those.

Figure 15:
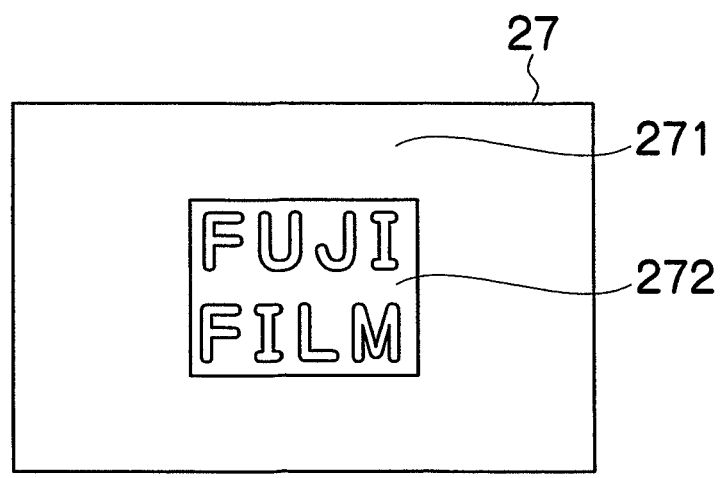
FIG. 15 is a plan view showing a barcode in which an encoded region and a display region are arranged exclusively.

Below, as shown in FIG. 15, a display mode is described in which a first bitmap 271 encoded so as to be readable by a terminal device such as a mobile telephone, and a second bitmap 272 depicting a recognizable display which comprises characters, a figure, a symbol or a combination thereof, are arranged in a mutually exclusive fashion in a two-dimensional barcode 27.

Figure 16:
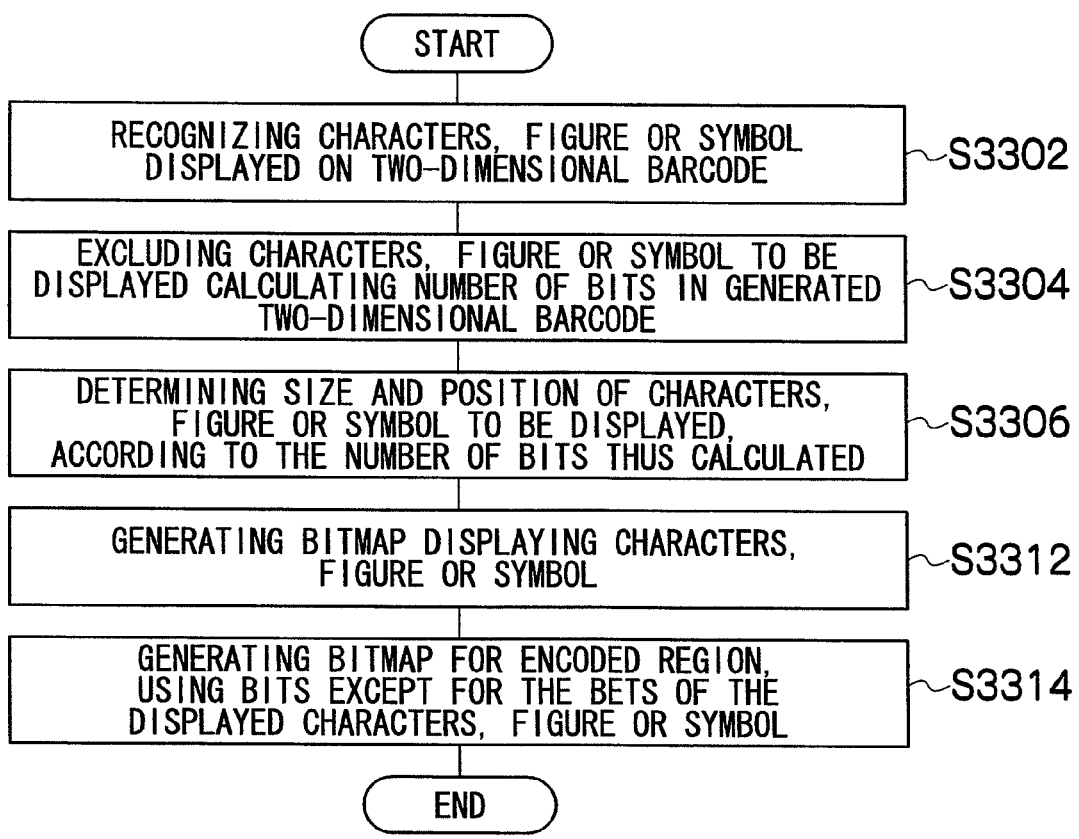
FIG. 16 is a flow diagram showing the sequence of processing for editing a barcode in which an encoded region and a display region are arranged exclusively.

FIG. 16 is a flow diagram showing the sequence of processing for editing the two-dimensional barcode 27 according to the above display mode.

In FIG. 16, the first bitmap 271 and the second bitmap 272 are constituted respectively by a plurality of binary bits. For example, a binary bit indicates a color or a black when "1" is set, while indicating a white when set to "0".

First, as shown in FIG. 16, the characters, figure or symbol displayed on the two-dimensional barcode 27 are recognized (S3302).

For example, as described previously in the first embodiment, the characters, figure or symbol displayed are recognized according to the function of the mobile telephone started up when the two-dimensional barcode 27 is read in. Alternatively, as described in the third embodiment, the characters, figure or symbol inputted by the user are recognized.

Next, the number of bits in the two-dimensional barcode 27 to be generated, apart from the characters, figure or symbol displayed on the two-dimensional barcode 27 (in other words, the number of bits in the first bitmap 271) is calculated in advance (S3304).

For example, if a first bitmap 271 is generated by encoding a URL (for example, "http://www.fujifilm.co.jp"), then the two-dimensional barcode is created only by encoding this URL. The bit number of the bitmap is calculated assuming that the recognizable display is not embedded into the two-dimensional barcode.

Next, the size and position of the characters, figure, or symbol to be displayed on the two-dimensional barcode are determined principally according to the number of bits in the first bitmap 271 (S3306).

For example, the size and the position of the characters comprising the second bitmap 272 are calculated in accordance with the ratio between a maximum number of bits specified for a two-dimensional barcode of a prescribed size designed in accordance with prescribed specifications, and the number of bits in the first bitmap 271.

Furthermore, for example, the size of each character and the position of each character are determined according to the number of characters in the character string forming the second bitmap 272.

Moreover, for example, if the characters of the text forming the second bitmap 272 are English text characters, then the size of the characters is set to a smaller size than in cases where the text characters are Japanese kanji text characters.

More specifically, if a two-dimensional barcode 27 is to be generated in which a character string (for example, "FUJI FILM") is displayed while encoding a URL, then the size and positions of the respective text characters (for example, F, U, J, I, F, I, L, and M) are determined on the basis of the number of bits in the first bitmap 271 which contains the encoded URL, as well as the number of characters and the type of characters (for example, English text characters) in the character string.

Next, a two-dimensional barcode 272 displaying characters, a figure or a symbol is generated (S3312).

For example, if a two-dimensional barcode 27 displaying the character string "FUJI FILM" is created, then a second bitmap 272 is generated, which is also arranged within the two-dimensional barcode 27 exclusively with respect to the first bitmap 271 which displaying the character string "FUJI FILM". The second bitmap 272 in FIG. 15 is not superimposed on the chromatic portion of the first bitmap 271, and neither is it embedded by blanking out in a surplus portion where no valuable information is present, but rather, it is arranged exclusively with respect to the first bitmap 271. More specifically, the character string "FUJI FILM" is formed as a second bitmap 272 comprising two levels, which are an upper level and a lower level, in the center of the two-dimensional barcode 27.

Then, a bitmap of the encoded portion is generated using the displayed bits without the bits of the characters, figure, or symbol (S3314).

For example, if a two-dimensional barcode 27 displaying the character string "FUJI FILM" is generated, then a first bitmap 271, which the URL read by the mobile telephone is encoded, is generated surrounding the second bitmap 272 which displays the character string "FUJI FILM".

As shown in FIG. 16, the two-dimensional barcode editing process described above is executed principally by the barcode editing device (referring to the numeral 154 in FIG. 1, the numeral 1542 in FIG. 7, and the numeral 1543 in FIG. 11), in the barcode creation apparatus (referring to the numeral 10 in FIG. 1, the numeral 102 in FIG. 7, and numeral 103 in FIG. 11) according to the first to third embodiments described previously. In addition, the aforementioned two-dimensional barcode editing process shown in FIG. 16 is executed principally in a two-dimensional barcode editing step (referring to S30 in FIG. 2, S230 in FIG. 8, and S330 in FIG. 12) within the flow diagrams described previously in the first to third embodiments.

Needless to say, the display embedded in the two-dimensional barcode must be embedded therein in such a manner that it does not affect the recognition of the two-dimensional barcode when the two-dimensional barcode is read in by the terminal device such as the mobile telephone. For example, the color of the second bitmap forming the display region may be set to a light color, so as not to affect the reading of the barcode by the terminal device. Furthermore, it is also possible to provide a gap between the first bitmap forming the encoded region and the second bitmap forming the display region, in such a manner that reading of the terminal device is not affected.

As described above, the present invention is explained using an example in which a barcode creation apparatus is constituted by a computer apparatus. In this case, the two-dimensional barcode creation process is performed by means of the computer apparatus executing a program. The barcode creation apparatus is not limited to a computer apparatus, and may also be constituted by a dedicated device. In addition, the foregoing descriptions related to a case where a portable telephone is used as a terminal device, but the terminal device is not limited to a portable telephone, and other terminal devices capable of reading in a two-dimensional barcode may also be used.

Furthermore, the two-dimensional barcodes and the images shown in the drawings indicate examples for the purpose of making the present invention readily comprehensible, and other different barcodes and images may be used within a scope that does not deviate from the essence of the present invention.

For example, it is also possible to use large-size display marks. In addition, it is also possible, for example, to use any type of display characters, provided that those are displayed so as to be visually distinguishable within the size of the two-dimensional barcode. Furthermore, for example, the display marks may also be embedded into the position determination pattern in the two-dimensional barcode. However, it needs to embed those marks in such a manner that they do not impede the identification of the bitmap of the two-dimensional barcode by the terminal device.

Needless to say, the invention is not limited to cases where one of either characters, a figure (for example, an icon), or a symbol is displayed within a two-dimensional barcode, and a combination thereof may be displayed. For example, it is also possible to display a combination of characters and a figure, a combination of characters and a symbol, or a combination of all of those.

Additionally, the barcode according to the present invention may also be a barcode except for a QR code (registered trademark). For example, it may be another type of two-dimensional barcode such as a maxi code, a data matrix, and PDF 417, or it may be a JAN code, ITF, UCC/EAN 128, or the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A barcode creation apparatus which creates a barcode read in by a prescribed terminal device, comprising:
a function specification device which specifies a function which allows the terminal device to initiate the function when the barcode is read in, from a plurality of functions that the terminal device has;
a color specification device which specifies a color of the barcode, the color visually representing the function specified by the function specification device; and
a barcode creation device which creates the barcode in the specified color.

2. A barcode creation apparatus according to claim 1, wherein
the color specification device specifies a first barcode color, and the barcode includes a barcode pattern in said first barcode color set against a background having a background color which is different from the first barcode color, said barcode pattern further includes at least one of a: display character and the display mark produced in a second barcode color which is different from the first barcode color and the background color, and the display mark or character is only produced using the second barcode color in regions of the barcode pattern which do not correspond to the background.

3. A barcode creation apparatus, comprising:
a color specification device which specifies a color of a two-dimensional barcode according to color information of an object into which the barcode is to be embedded;
an arrangement determination device which determines a position in which to embed the barcode according to the specified color of the barcode and the color information of the object into which the barcode is to be embedded; and
a barcode creation device which creates the barcode with the color specified by the color specification device;
wherein the object to include the barcode is an image, and the image is scanned by blocks corresponding to a shape of the two-dimensional barcode, and wherein a block having a color tone deviation range which is equal to or less than a prescribed value is determined from the scanned blocks as corresponding to the position in which the barcode is to be embedded.

4. A barcode creation apparatus according to claim 3, wherein the arrangement determination device determines the position to embed the barcode by further determining the scanned block of the object having a color tone which is closest in color tone to the specified barcode color.

5. A barcode creation method, comprising the steps of:
specifying a function which allows a prescribed terminal device to initiate the function when a barcode is read in, from a plurality of functions that the terminal device has;
specifying a color of the barcode, the color visually representing the specified function; and
creating the barcode in the specified color.

6. A barcode creation method according to claim 5, wherein specifying the color of the barcode comprises: specifying a first barcode color, wherein the barcode includes a barcode pattern in said first barcode color set against a background having a background color which is different from the first barcode color, said barcode pattern further includes at least one of a: display character and the display mark produced in a second barcode color which is different from the first barcode color and the background color, and the display mark or character is only produced using the second barcode color in regions of the barcode pattern which do not correspond to the background.

7. A barcode creation method, comprising the steps of:
specifying a color of a two-dimensional barcode according to color information of an object into which the barcode is to be embedded;
determining a position in which to embed the barcode according to the specified color of the barcode and the color information of the object into which the barcode is to be embedded; and
creating the barcode in the specified color;
wherein the object to include the barcode is an image, and the image is scanned by blocks corresponding to a shape of the two-dimensional barcode, and wherein a block having a color tone deviation range which is equal to or less than a prescribed value is determined from the scanned blocks as corresponding to the position in which the barcode is to be embedded.

8. A barcode creation method according to claim 7, wherein determining the position to embed the barcode further includes determining the scanned block of the object having a color tone which is closest in color tone to the specified barcode color.

9. A computer readable medium having embodied thereon a computer program for processing by a computer, the computer program comprising:
a first code segment for specifying a function which allows a prescribed terminal device to initiate the function when a barcode is read in, from a plurality of functions that the terminal device has;
a second code segment for specifying a color of the barcode, the color visually representing the specified function; and
a third code segment for creating the barcode in the specified color.

10. A computer readable medium according to claim 9, wherein
the second code segment includes a segment for specifying a first barcode color, wherein the barcode includes a barcode pattern in said first barcode color set against a background having a background color which is different from the first barcode color, said barcode pattern further includes at least one of a: display character and the display mark produced in a second barcode color which is different from the first barcode color and the background color, and the display mark or character is only produced using the second barcode color in regions of the barcode pattern which do not correspond to the background.

11. A computer readable medium having embodied thereon a computer program for processing by a computer, the computer program comprising:
a first code segment for specifying a color of a two-dimensional barcode according to color information of an object into which the barcode is to be embedded;
a second code segment for determining a position in which to embed the barcode according to the specified color of the barcode and the color information of the object into which the barcode is to be embedded; and
a third code segment for creating the barcode in the specified color;
wherein the object to include the barcode is an image, and the image is scanned by blocks corresponding to a shape of the two-dimensional barcode, and wherein a block having a color tone deviation range which is equal to or less than a prescribed value is determined from the scanned blocks as corresponding to the position in which the barcode is to be embedded.

12. A computer readable medium according to claim 11, wherein the second code segment for determining the position to embed the barcode further includes determining the scanned block of the object having a color tone which is closest in color tone to the specified barcode color.

* * * * *